June 6, 1967  L. H. KING  3,323,707

TEAR-OPEN PACKAGE

Filed Feb. 15, 1966

INVENTOR.
LEONARD H. KING
BY Jack W. Benjamin
AGENT

United States Patent Office 3,323,707
Patented June 6, 1967

3,323,707
TEAR-OPEN PACKAGE
Leonard H. King, 99 W. Hawthorne Ave.,
Valley Stream, N.Y. 11580
Filed Feb. 15, 1966, Ser. No. 527,568
4 Claims. (Cl. 229—66)

ABSTRACT OF THE DISCLOSURE

In an imperforate plastic package, improved means are provided for tearing the plastic. Ribs are extruded integrally with a plastic sheet. The ribs are superimposed on at least one surface of the sheet which is of uniform thickness. The sheet is neither thinned nor perforated. When folded on itself, the sheet is used to form a package having ribs that facilitate the opening thereof.

---

The present invention relates to wholly sealed, imperforate plastic packages and more particularly to improved means integrally formed therewith that permit rupturing the package along an accurately predetermined line.

Since additional or separate components are not required, the present invention clearly distinguishes over that portion of the prior art utilizing as an opening aid, a length of string or other material positioned between the layers of plastic. The present invention also distinguishes over U.S. Patent No. 3,186,628, issued on June 1, 1965, to William A. Rohde. In the aforementioned patent, a reduced thickness line or groove is formed in either one or both confronting layers of plastic which is then sealed about its periphery.

By way of contrast, the present invention provides at least one or, as is preferable in some cases, two ribs having a thickness somewhat greater than the thickness of the two opposed layers of plastic sheet. In addition, a starting notch is formed in the edge of the plastic package proximate the single rib or intermediate the two ribs which are parallel and closely spaced to each other. The rib is placed near the end of the package that is to be opened.

The advantage of the construction to be described is that the package is not weakened by a reduced thickness line. A second advantage of this invention is that the rib or ribs provide a guiding edge along which the tear is made. Thus the instant invention finds particular utility in a package that is functional after it is opened as opposed to a package that is discarded after its contents are removed. Still another advantage is that the present invention may be used with relatively thick plastic containers wherein a scored line used to facilitate opening will dangerously weaken a fully loaded container.

Accordingly, it is an object to provide improved opening means for a plastic package.

It is another object to provide improved means for opening a package comprised of two opposed layers of thermoplastic material that has been sealed about its periphery.

Another object is to provide an imperforate, wholly sealed plastic package with a thickened rib extending thereacross that serves as guide means for tearing open the package.

A further object is to provide an imperforate, wholly sealed plastic package with a pair of parallel, closely spaced thickened ribs extending thereacross, the ribs serving as guide means for tearing open the package.

It is another object of this invention to provide a starting notch on the edge of the package, the notch being positioned proximate one of the aforementioned ribs.

An important feature of this invention is that the opening means formed integrally with the opposed plastic layers does not weaken the package.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

Figure 1:
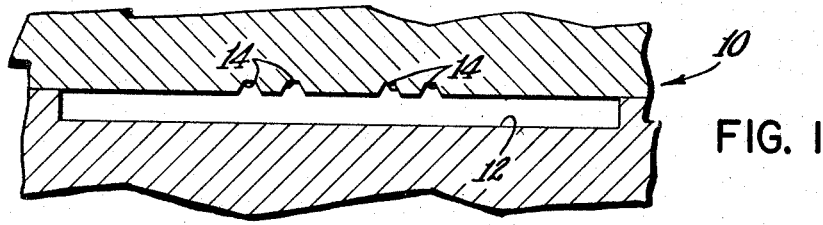
FIG. 1 is a transverse, sectional elevational view through a typical extrusion die that is used to produce the package utilizing this invention.

Referring now to the drawing, an extrusion die 10 is shown in FIG. 1. The die is provided with an elongated transverse opening 12, the dimensions of which determine the width and thickness of the plastic sheet that is to be made. It is presently contemplated that a flexible extrusion may be made by using materials such as polyethylene, polypropylene, cellulose acetate, nylon, vinyl resins, such as polyvinylidene chloride, polyvinyl chloride, polyvinyl acetate and their mixtures or copolymers. The film or layer of plastic sheet resulting from the extrusion process may be used to form a package such as that shown in a simplified form in the accompanying drawing.

Figure 2:
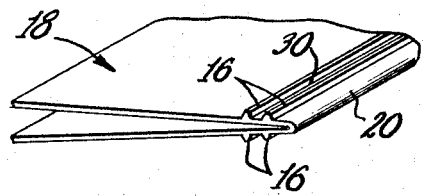
FIG. 2 is a perspective view illustrating a plastic sheet that has been extruded in accordance with this invention. The sheet is shown folded and ready for sealing.

Of particular importance are the notches or recesses 14 which face the opening 12 in the extrusion die. During extrusion these recesses form parallel ribs 16 along the length of the sheet. This may be clearly seen in FIG. 2 wherein an extruded sheet 18 is shown after it has been folded on itself to define a sealed edge 20. It should be noted that the ribs are parallel and close to edge 20.

Figure 3:
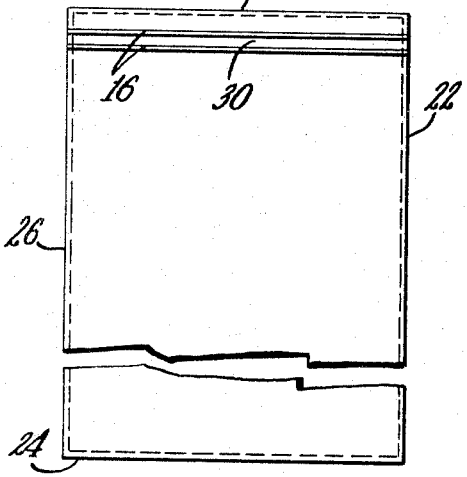
FIG. 3 is a plan view of an envelope incorporating the features of the present invention.

Suitable heat sealing and die cutting means, well known in the art and needing no further description, form the rectangular package shown in FIG. 3. The shape of the package is determined by the heat sealing and die cutting means and therefore is not a limitation to the present invention. Articles having an irregular outline such as a glove may be fabricated just as easily. During the blanking operation the remaining three sides, 22, 24 and 26, are heat sealed so that the interior of the package is inaccessible to contaminants.

Figure 4:
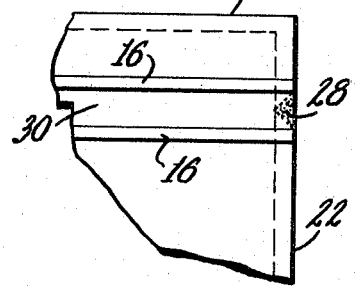
FIG. 4 is an enlarged fragmentary view of one corner of the envelope shown in FIG. 3.

In addition to sealing the three remaining sides the blanking operation is used to place a heat sealed area 28 on edge 22 intermediate the ends of the thickened ribs 16. This is shown in an enlarged scale in FIG. 4. Thus only the edge of the package is weakened and is used as the starting point of the tear. It should be noted that the body portion of the package, inward of the heat sealed edges, is in no way weakened and is in fact reinforced by the ribs. When the package is opened, the channel 30 defined by the parallel, thickened ribs, serves as a guide to restrict and confine the line on which the tear is to be made. Thus, for a package that is to be used after it is opened, a clean, neat edge is assured. Conversely, the package cannot be improperly torn open and multilated unless done so intentionally.

Figure 5:
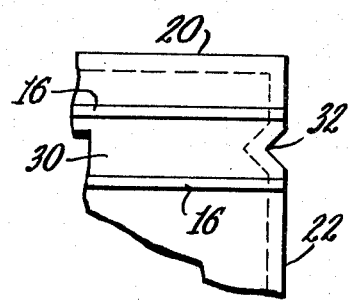
FIG. 5 is an enlarged, fragmentary view of one corner of an envelope illustrating an alternative form of construction.

FIG. 5 illustrates an alternative starting point for the opening tear of the package. The sealed edge is notched and material removed at 32 during the die cutting operation. As in the previous embodiment, the notch is placed in between the parallel thickened ribs. Means are thereby provided for starting the tear that is then guided and controlled by the ribs.

Figure 6:
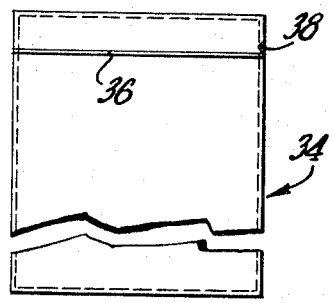
FIG. 6 is an enlarged, fragmentary view of an envelope utilizing still another alternative form of opening means.

There are certain applications that require a sealed envelope that is discarded after the contents are removed. Accordingly, the neatness of the tear is not of paramount importance. It is necessary, however, that the package be as strong as possible. Patent No. 3,186,628 fails in this respect because weakened lines are provided as tearing or opening means. In the embodiment shown in FIG. 6 package 34 is provided with only one thickened rib 36 on each layer and a starting notch 38 of either of the two types described above. Of course, the extruding die would be suitably altered so that two recesses produce two spaced parallel ribs instead of four. Without weakening the package the single rib on each layer of plastic provides guide means for the opening tear.

Having thus disclosed the best embodiment of the invention presently contemplated, it is to be understood that various changes and modifications may be made by those skilled in the art without departing from the spirit of the invention.

What is claimed is:
1. Improved opening means for a rupturable package having a pair of opposed imperforate thermoplastic layers joined to each other along the periphery thereof, said improvement comprising at least one rib integrally formed on the surface of each of said two layers, said ribs and said respective layers, in combination, being of greater thickness than the individual layers, said ribs defining a line along which the package is to be opened.
2. The structure in accordance with claim 1 wherein each layer includes two substantially parallel and closely spaced ribs.
3. An improved, rupturable package comprising:
  (a) a pair of opposed imperforate thermoplastic layers joined to each other along the periphery thereof; and
  (b) at least one rib integrally formed on the surface of each of said two layers, said ribs and said respective layers, in combination, being of greater thickness than the individual layers, said ribs defining a line along which the package is to be opened.
4. The structure in accordance with claim 3 wherein each layer includes two substantially parallel and closely spaced ribs of greater thickness than the layers.

References Cited

UNITED STATES PATENTS

| | | | |
|---|---|---|---|
| 2,946,434 | 7/1960 | Brina | 206—56 |
| 3,034,941 | 5/1962 | Hessenthaler et al. | 229—51 |
| 3,084,793 | 4/1963 | Pitman | 229—51 |
| 3,186,628 | 6/1965 | Rohde | 229—66 |
| 3,207,417 | 9/1965 | Hennessey et al. | 229—51 |

JOSEPH R. LECLAIR, *Primary Examiner.*

D. M. BOCKENEK, *Assistant Examiner.*